E. R. HOFF.
ARTIFICIAL TOOTH.
APPLICATION FILED SEPT. 5, 1917.

1,269,440.

Patented June 11, 1918.

WITNESSES:
Edw. Thorpe

INVENTOR
Edward R. Hoff
BY
ATTORNEY

UNITED STATES PATENT OFFICE.

EDWARD R. HOFF, OF BROOKLYN, NEW YORK.

ARTIFICIAL TOOTH.

1,269,440.  Specification of Letters Patent.  Patented June 11, 1918.

Application filed September 5, 1917. Serial No. 189,725.

*To all whom it may concern:*

Be it known that I, EDWARD R. HOFF, a citizen of the United States, and a resident of the city of New York, borough of Brooklyn, in the county of Kings and State of New York, have invented a new and Improved Artificial Tooth, of which the following is a full, clear, and exact description.

The invention relates to dentistry and its object is to provide a new and improved artificial tooth provided with simple and efficient attaching means for attaching the artificial tooth to the plate and made of gold or other metal cheaper than platinum heretofore used and embedded in the porcelain or other material of which the tooth is made.

In order to accomplish the desired result, use is made of an artificial tooth provided at the back with sockets, attaching posts having bases inserted in the said sockets, and locking means extending in the said artificial tooth and engaging the bases of the said posts to lock the latter in place in their sockets.

A practical embodiment of the invention is represented in the accompanying drawings forming a part of this specification, in which similar characters of reference indicate corresponding parts in all the views.

In the manufacture of artificial teeth from porcelain and similar vitreous material, use is made of posts or pins having their bases embedded and baked in the vitreous material. Owing to the high heat required in baking the originally plastic vitreous material, it is necessary to employ posts or pins of a high heat resisting metal, such as platinum, to prevent melting of the posts or pins during the baking process. The main object of my invention is to dispense with the high priced platinum posts or pins and to permit the use of a less expensive metal, such as gold, which is also not liable to a corrosive action by the acids in the saliva or food consumed by the person using the artificial teeth.

Figure 1:
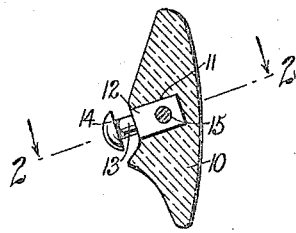
Figure 1 is an enlarged cross section of the artificial tooth, on the line 1—1 of Fig. 2.
Figure 2:
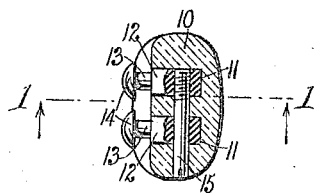
Fig. 2 is a sectional plan view of the same on the line 2—2 of Fig. 1.

For the purpose mentioned the body 10 of the artificial tooth is made of porcelain or other vitreous material and is provided at the back with one or more sockets 11 in each of which fits the base 12 of a post or pin 13 projecting a desired distance from the back and terminating at its outer end in the usual head 14. In order to securely fasten the bases 12 of the pins 13 in place in the body 10 of the artificial tooth use is made of a fastening means preferably in the form of a screw 15 extending through one side of the tooth body 10 and passing through the base 12 of one post or pin and screwing in the base of the other post or pin, as will be readily understood by reference to Fig. 2. The outer end of the screw 15 is flush with the corresponding side of the tooth body 10.

Figure 3:
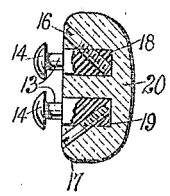
Fig. 3 is a similar view of a modified form of the artificial tooth.

Instead of a single screw 15 for fastening both posts or pins in position in the tooth body 10 use may be made of two screws 16 and 17 (see Fig. 3) screwing into the bases 18 and 19 from the back of the tooth body 20 in converging directions. In this case the outer ends of the screws 16 and 17 are flush with the back of the tooth 20 and covered by the plate on attaching the posts or pins to the plate. Thus acid is not liable to reach the screws and exert a deleterious influence on the same and at the same time the screws 16 and 17 are locked against unscrewing movement.

In practice the bases 12, 18 and 19 are made square and fit snugly in the correspondingly shaped sockets in the tooth bodies to prevent turning of the posts or pins.

Having thus described my invention, I claim as new and desire to secure by Letters Patent:—

1. An artificial tooth, comprising a tooth body of vitreous material provided with a socket, a post having a head and a base fitting the said socket, and a screw in the said tooth body and engaging the said base.

2. An artificial tooth, comprising a tooth body of vitreous material provided with spaced sockets at the back, posts having bases fitting into the said sockets, each socket and the base therein being approximately rectangular in cross section to hold the post against turning and a screw passing into the tooth from one side thereof and engaging both post bases.

3. An artificial tooth, comprising a tooth body of vitreous material provided with spaced sockets at the back, posts having bases fitting into the said sockets, and a screw passing into the tooth from one side thereof, passing through the base of one post and screwing into the base of the other post.

EDWARD R. HOFF.

Copies of this patent may be obtained for five cents each, by addressing the "Commissioner of Patents, Washington, D. C."